US012620274B2

(12) United States Patent
Kumar

(10) Patent No.: US 12,620,274 B2
(45) Date of Patent: May 5, 2026

(54) SYSTEMS AND METHODS FOR DETECTING FULL-STOPS TO REDUCE VEHICLE ACCIDENTS

(71) Applicant: Quanata, LLC, San Francisco, CA (US)

(72) Inventor: Vinay Kumar, Fremont, CA (US)

(73) Assignee: QUANATA, LLC, San Francisco, CA (US)

( * ) Notice: Subject to any disclaimer, the term of this patent is extended or adjusted under 35 U.S.C. 154(b) by 73 days.

(21) Appl. No.: 18/737,972

(22) Filed: Jun. 8, 2024

(65) Prior Publication Data

US 2024/0331456 A1 Oct. 3, 2024

Related U.S. Application Data

(63) Continuation of application No. 17/680,667, filed on Feb. 25, 2022, now Pat. No. 12,008,842, which is a
(Continued)

(51) Int. Cl.
*G07C 5/00* (2006.01)
*B60Q 9/00* (2006.01)
(Continued)

(52) U.S. Cl.
CPC .............. G07C 5/008 (2013.01); B60Q 9/00 (2013.01); G01C 21/32 (2013.01);
(Continued)

(58) Field of Classification Search
CPC ...... G07C 5/008; G07C 5/0825; G07C 5/085; B60Q 9/00; G01C 21/32; G01C 21/3461;
(Continued)

(56) References Cited

U.S. PATENT DOCUMENTS 7,433,889 B1 10/2008 Barton
8,791,806 B2 7/2014 Granruth
(Continued)

*Primary Examiner* — Behrang Badii
(74) *Attorney, Agent, or Firm* — BRYAN CAVE LEIGHTON PAISNER LLP

(57) ABSTRACT

A telematics analysis computing device for monitoring driving behavior of a driver of a vehicle, the telematics analysis computing device comprising one or more processors in communication with a memory device comprising computer instructions that, when run on the one or more processors, cause the one or more processors to execute operations: receiving telematics data collected from one or more electronic devices of one or more users; analyzing the telematics data to determine (a) one or more stop locations and (b) one or more driving behaviors of the one or more users at the one or more stop locations; generating, based on analyzing the telematics data, safety scores for the one or more stop locations; generating a route based on a request received from an electronic device of the driver; identifying, along the route, as generated, at least one of the one or more stop locations having a respective safety score of the safety scores that is below a predetermined threshold; and transmitting a notification to the electronic device of the driver that at least one of the one or more stop locations has at least one respective safety score of the safety scores that is below the predetermined threshold.

20 Claims, 6 Drawing Sheets

Related U.S. Application Data continuation of application No. 16/788,789, filed on Feb. 12, 2020, now Pat. No. 11,295,559.

(51) Int. Cl.

| | |
|---|---|
| *G01C 21/32* | (2006.01) |
| *G01C 21/34* | (2006.01) |
| *G07C 5/08* | (2006.01) |
| *G06Q 40/08* | (2012.01) |

(52) U.S. Cl.

CPC ....... *G01C 21/3461* (2013.01); *G07C 5/0825* (2013.01); *G07C 5/085* (2013.01); *G06Q 40/08* (2013.01)

(58) Field of Classification Search

CPC ........... G01C 21/3617; G01C 21/3815; G06Q 40/08; G08G 1/0129

See application file for complete search history.

(56)                References Cited

U.S. PATENT DOCUMENTS

| | | | | |
|---|---|---|---|---|
| 9,141,112 | B1 * | 9/2015 | Loo ................... | G08G 1/096838 |
| 9,489,637 | B2 | 11/2016 | Modica et al. | |
| 10,209,085 | B2 | 2/2019 | Chokshi et al. | |
| 10,317,223 | B1 | 6/2019 | Hayward | |
| 2013/0084847 | A1 | 4/2013 | Tibbitts et al. | |
| 2013/0338914 | A1 | 12/2013 | Weiss | |
| 2014/0074402 | A1 | 3/2014 | Hassib et al. | |
| 2014/0113619 | A1 * | 4/2014 | Tibbitts ............... | G07C 5/0808 |
| | | | | 455/419 |
| 2016/0247394 | A1 | 8/2016 | Stenneth | |
| 2018/0135989 | A1 * | 5/2018 | Schreier ............... | G01C 21/343 |
| 2019/0332106 | A1 * | 10/2019 | Belloni Mourao ... | B60W 40/08 |
| 2020/0062274 | A1 * | 2/2020 | Kowal ..................... | G07C 5/02 |
| 2020/0223383 | A1 | 7/2020 | Awad Alla et al. | |
| 2022/0126864 | A1 * | 4/2022 | Moustafa .......... | B60W 60/0013 |

* cited by examiner

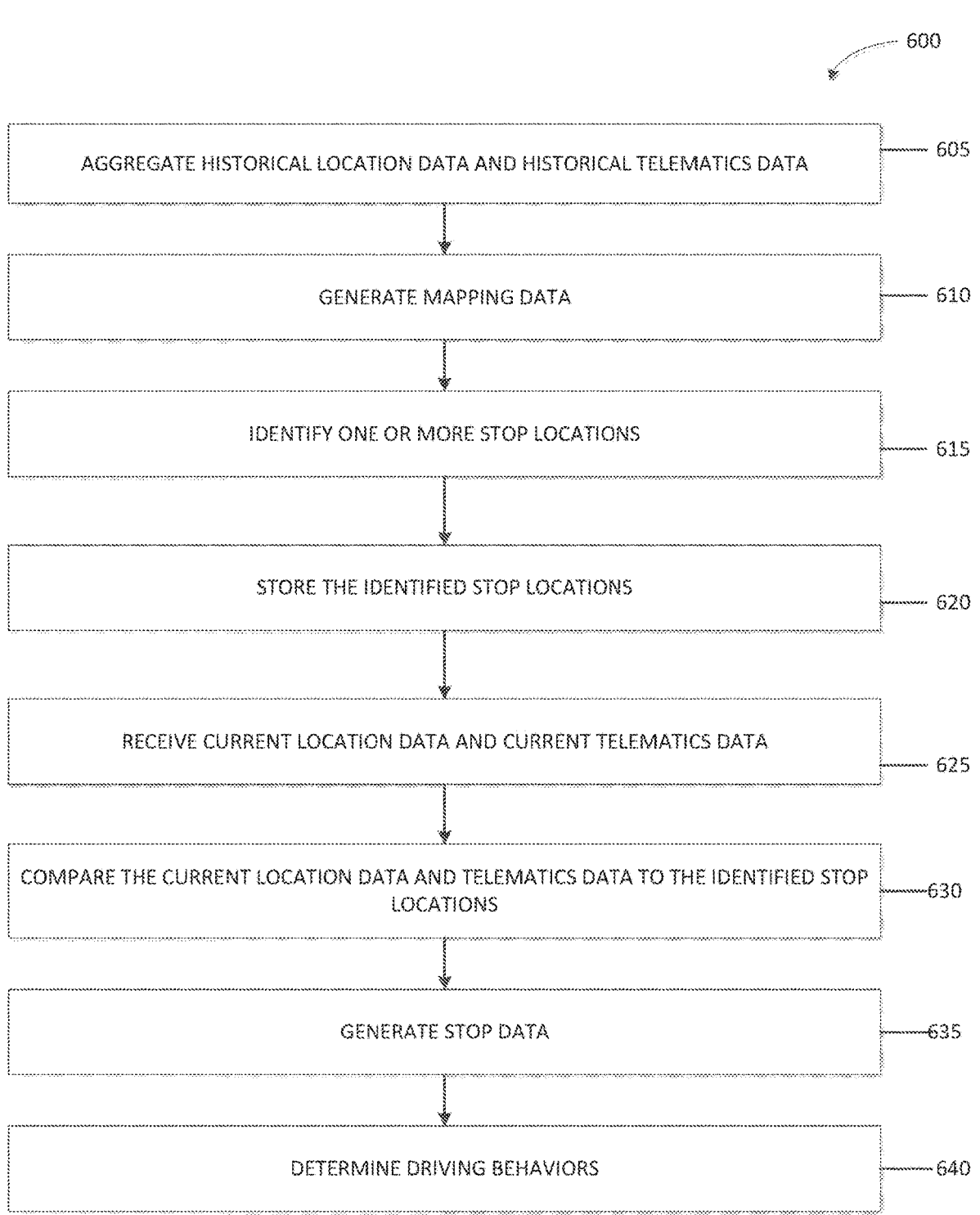

600

AGGREGATE HISTORICAL LOCATION DATA AND HISTORICAL TELEMATICS DATA — 605

GENERATE MAPPING DATA — 610

IDENTIFY ONE OR MORE STOP LOCATIONS — 615

STORE THE IDENTIFIED STOP LOCATIONS — 620

RECEIVE CURRENT LOCATION DATA AND CURRENT TELEMATICS DATA — 625

COMPARE THE CURRENT LOCATION DATA AND TELEMATICS DATA TO THE IDENTIFIED STOP LOCATIONS — 630

GENERATE STOP DATA — 635

DETERMINE DRIVING BEHAVIORS — 640

FIGURE 6

SYSTEMS AND METHODS FOR DETECTING FULL-STOPS TO REDUCE VEHICLE ACCIDENTS

CROSS-REFERENCE TO RELATED APPLICATIONS

The present application is a Continuation Application of U.S. patent application Ser. No. 17/680,667, filed on Feb. 25, 2022, which is a continuation of U.S. patent application Ser. No. 16/788,789, filed on Feb. 12, 2020, patented as U.S. Pat. No. 11,295,559, which are herewith incorporated by reference in their entirety.

TECHNICAL FIELD

The present disclosure relates to systems and methods for monitoring driver behavior for drivers of vehicle, and more particularly, to systems and methods for detecting full-stops and/or rolling stops at an intersection by a driver of a vehicle using telematics data so as to prevent and/or reduce accidents.

BACKGROUND

In at least some known systems for assessing drivers of vehicles, navigation may be used to assess the drivers. Further, in some known systems, position, acceleration, speed, and location may be determined from navigation data associated with the users. However, no known systems include accurately mapping signage (e.g., stop signs, stoplights, etc.) and determining how drivers interact with the signage. Accordingly, such a system is needed.

BRIEF SUMMARY

The present embodiments may relate to, inter alia, systems and methods for monitoring driving behaviors of a driver (e.g., a driver of a vehicle) through telematics and location data (e.g., from sensors including GPS, accelerometers, and gyroscopes of a user computing device and/or sensors imbedded within and/or in communication with the vehicle of the user) during vehicle operation. Collected telematics data may be analyzed to reveal locations of stop signs, stop lights, and intersections. Further analysis may reveal certain driving behaviors, such as rolling stops, and provide real-time feedback to a driver. Some embodiments of the present disclosure may use, for example, GPS location data, accelerometer data and machine learning techniques to map stoplight and stop sign locations. Further embodiments of the present disclosure may use, for example, GPS location data and accelerometer data of a driver to detect aberrant driving behavior (e.g., driving characteristics where the driver does not stop and/or does not fully stop, also known as "rolling-stops" through stoplights and/or stop signs) by a driver of a vehicle in view of mapped stoplight and stop sign locations. In some embodiments, a real-time corrective action alert may be transmitted to the driver of the vehicle with respect to the detection of aggressive and/or aberrant driving behaviors of the driver and/or other users.

In one aspect, a telematics analysis (TA) computing device for monitoring driving behavior of a driver of a vehicle may be provided. The TA server may include one processor in communication with a memory device, and the at least one processor may be configured to: (i) aggregate historical location data and historical telematics data from a plurality of users, wherein the historical location data and historical telematics data are gathered by one or more devices associated with each user of the plurality of users, (ii) generate mapping data based at least in part upon the historical location data and the historical telematics data, (iii) identify one or more stop locations based at least in part upon the mapping data, (iv) store, in the memory device, the identified stop locations, (v) receive, from a user computing device associated with the driver of the vehicle, current location data and current telematics data after each trip taken by the driver, (vi) compare the current location data and the current telematics data to the identified stop locations, (vii) generate stop data associated with the driver for each trip taken by the driver, wherein the stop data includes whether the driver stopped at the identified stop locations during each trip, and/or (viii) determine one or more driving behaviors of the driver based at least in part upon the stop data, wherein the one or more driving behaviors includes how the driver behaves at the identified stop locations. The computing device may include additional, less, or alternative functionally, including that described elsewhere herein.

In another aspect, a computer-implemented method for monitoring driving behavior of a driver of a vehicle using a telematics analytics (TA) computing device including at least one processor in communication with at least one memory device may be provided. The method may include: (i) aggregating historical location data and historical telematics data from a plurality of users, wherein the historical location data and historical telematics data are gathered by one or more devices associated with each user of the plurality of users, (ii) generating mapping data based at least in part upon the historical location data and the historical telematics data, (iii) identifying one or more stop locations based at least in part upon the mapping data, (iv) storing, in the memory device, the identified stop locations, (v) receiving, from a user computing device associated with the driver of the vehicle, current location data and current telematics data after each trip taken by the driver, (vi) comparing the current location data and the current telematics data to the identified stop locations, (vii) generating stop data associated with the driver, wherein the stop data includes whether the driver stopped at the identified stop locations during each trip, and/or (viii) determining driving behaviors of the driver based at least in part upon the stop data, wherein the one or more driving behaviors includes how the driver behaves at the identified stop locations. The method may include additional, less, or alternate actions, including those discussed elsewhere herein.

In yet another aspect, at least one non-transitory computer-readable media having computer-executable instructions thereon may be provided, wherein when executed by at least one processor of a telematics analytics (TA) computing device in communication with a memory device causes the at least one processor to: (i) aggregate historical location data and historical telematics data from a plurality of users, wherein the historical location data and historical telematics data are gathered by one or more devices associated with each user of the plurality of users, (ii) generate mapping data based at least in part upon the historical location data and the historical telematics data, (iii) identify one or more stop locations based at least in part upon the mapping data, (iv) store, in the memory device, the identified stop locations, (v) receive, from a user computing device associated with the driver of the vehicle, current location data and current telematics data after each trip taken by the driver, (vi) compare the current location data and the current telematics data to the identified stop locations, (vii) generate stop data associated with the driver for each trip taken by the driver, wherein the stop data includes whether the driver stopped at the identified stop locations during each trip, and/or (viii) determine one or more driving behaviors of the driver based at least in part upon the stop data, wherein the one or more driving behaviors includes how the driver behaves at the identified stop locations. The instructions may direct additional, less, or alternate functionality, including that discussed elsewhere herein.

Several embodiments can include a telematics analysis computing device for monitoring driving behavior of a driver of a vehicle, the telematics analysis computing device comprising one or more processors in communication with a memory device comprising computer instructions that, when run on the one or more processors, cause the one or more processors to perform certain acts. The acts can include receiving telematics data collected from one or more electronic devices of one or more users. The acts also can include analyzing the telematics data to determine (a) one or more stop locations and (b) one or more driving behaviors of the one or more users at the one or more stop locations. The acts further can include generating, based on analyzing the telematics data, safety scores for the one or more stop locations. The acts additionally can include generating a route based on a request received from an electronic device of the driver. The acts also can include identifying, along the route, as generated, at least one of the one or more stop locations having a respective safety score of the safety scores that is below a predetermined threshold. The acts further can include transmitting a notification to the electronic device of the driver that at least one of the one or more stop locations has at least one respective safety score of the safety scores that is below the predetermined threshold.

Some embodiments can include a computer-implemented method for monitoring driving behavior of a driver of a vehicle, the computer-implemented method. The computer-implemented method can include receiving telematics data collected from one or more electronic devices of one or more users. The computer-implemented method also can include analyzing the telematics data to determine (a) one or more stop locations and (b) one or more driving behaviors of the one or more users at the one or more stop locations. The computer-implemented method further can include generating, based on analyzing the telematics data, safety scores for the one or more stop locations. The computer-implemented method additionally can include generating a route based on a request received from an electronic device of the driver. The computer-implemented method also can include identifying, along the route, as generated, at least one of the one or more stop locations having a respective safety score of the safety scores that is below a predetermined threshold. The computer-implemented method further can include transmitting a notification to the electronic device of the driver that at least one of the one or more stop locations has at least one respective safety score of the safety scores that is below the predetermined threshold.

A number of embodiments can include a system comprising one or more processors and one or more non-transitory computer-readable media storing computing instructions that, when executed on the one or more processors, cause the one or more processors to perform certain acts. The acts can include receiving telematics data collected from one or more electronic devices of one or more users. The acts also can include analyzing the telematics data to determine (a) one or more stop locations and (b) one or more driving behaviors of the one or more users at the one or more stop locations. The acts further can include generating, based on analyzing the telematics data, safety scores for the one or more stop locations. The acts additionally can include generating a route based on a request received from an electronic device of a driver. The acts also can include identifying, along the route, as generated, at least one of the one or more stop locations having a respective safety score of the safety scores that is below a predetermined threshold. The acts further can include transmitting a notification to the electronic device of the driver that at least one of the one or more stop locations has at least one respective safety score of the safety scores that is below the predetermined threshold.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Depending upon the embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 6 illustrates an exemplary method for detecting a full-stop or a rolling stop by a driver of a vehicle using the TA system illustrated in FIG. 1.

Figure 1:
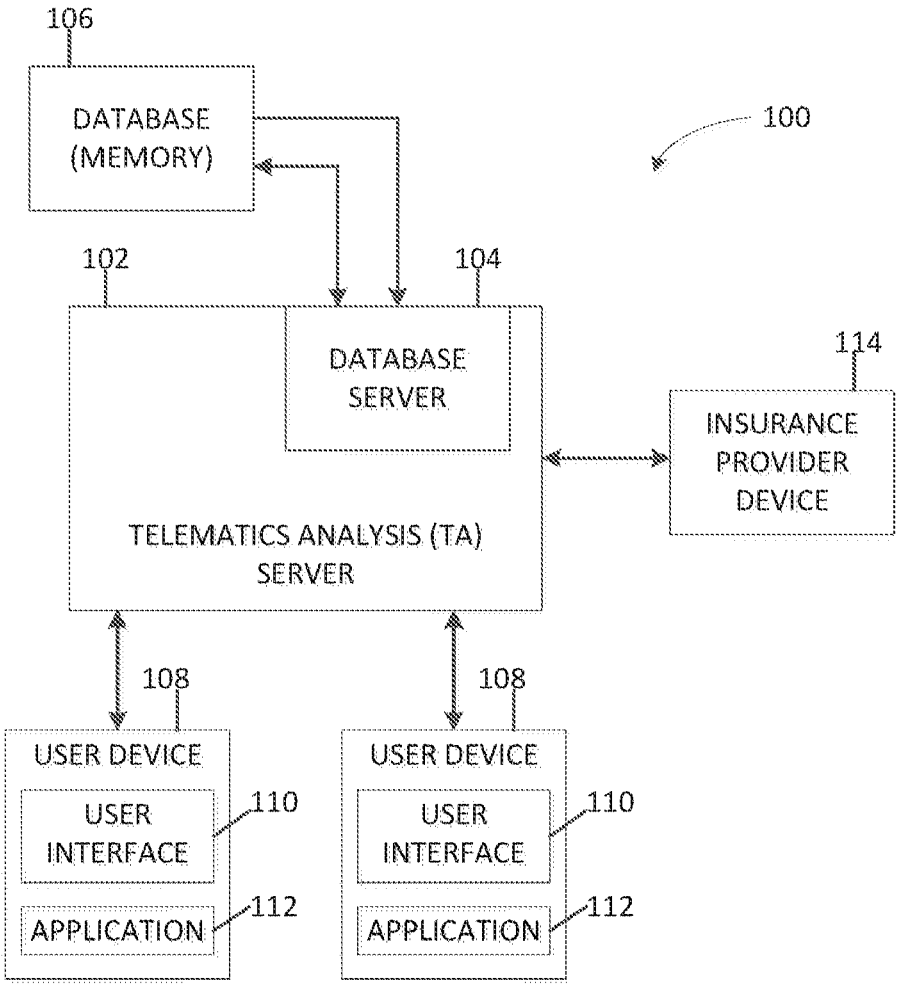
FIG. 1 illustrates an exemplary telematics analysis (TA) system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the disclosure described herein.

DETAILED DESCRIPTION OF THE DRAWINGS

The present embodiments may relate to, inter alia, systems and methods for the monitoring of driver behavior by collecting GPS data and telematics data during vehicle operation. Collected GPS data and telematics data may be analyzed to reveal locations of stop signs, stop lights, and intersections. Further analysis may reveal certain driver behaviors, such as rolling stops, and provide real-time feedback to a driver. Some embodiments of the present disclosure may use, for example, GPS location data, accelerometer data and machine learning techniques to map stoplight and stop sign locations. Further embodiments of the present disclosure may use, for example, GPS location data and accelerometer data of a driver to detect aberrant or aggressive driving behavior by a driver of a vehicle in view of mapped stoplight and/or stop sign locations. Real-time corrective action alerts may be transmitted to the driver of the vehicle with respect to the detection of aberrant driving behavior for the driver or other drivers around the location of the driver. In one exemplary embodiment, the process may be performed by a telematics analysis (TA) computing device.

As described below, systems and methods described herein monitor a driver's behavior by collecting telematics data during vehicle operation for the purpose of providing driver behavior feedback. As used herein, "driver" refers to a person actually driving a vehicle. "Stopping locations" refers to locations on a map where a vehicle is expected to, according to traffic laws, make a stop when needed (e.g., at a stop sign or when a stoplight is red). Example stopping locations may be stop signs, red lights, or the like. As described herein, a driver of a vehicle may be notified, either in real-time or on a periodic basis, of corrective actions that may be taken during the operation of a vehicle based their GPS and telematics data.

In some exemplary embodiments, the systems and methods may be used to implement an accident prevention platform. For the purposes of accident prevention, GPS data and other telematics data may be gathered in real-time. For example, the systems and methods described herein may additionally or alternatively include receiving, along with measurements of geographic coordinates, telematics data (e.g., accelerometer and/or gyroscope measurements), for real-time analysis from multiple vehicles. Aggregated geographic coordinates and telematics data may be analyzed in real-time to calculate the likelihood of an accident between the multiple vehicles. Based at least in part upon the likelihood, a corrective action alert may be issued for the purpose of preventing the accident. Further, the systems and methods described herein may also receive position data (e.g., from sensors including GPS sensors of a mobile device of a user/driver and/or a vehicle of the user/driver) to determine how often users make complete stops at stop signs and/or intersections. For example, the systems and methods described herein may notify a user that the driver made a complete stop at 97% of stop signs/stop locations.

In other words, the system described herein can notify users of high risk intersections on typical routes taken by the users. High risk intersections may include intersections where users do not typically make complete stops and/or may typically be late getting through the intersections (e.g., there may be a high rate of users running stoplights at the high risk intersections). Further, the system described herein may receive telematics and location data from users in real-time and provide alerts to users (e.g., for example, if, by comparing the telematics data of a user to other users, it looks like a user is going to run a stop light and/or run a stop sign). Even further, the system described herein may provide reports to users (e.g., every week, every two weeks, every month, etc.) informing the users of how the users performed.

Examples of Receiving Geographic Location Data and Telematics Data from User Devices The TA server may receive geographic coordinate data and/or telematics data from a plurality of user devices (e.g., mobile devices and/or other sensors mounted on or within a vehicle of a plurality of vehicles). The plurality of user devices may include components for capturing and generating data, such as a GPS device, an accelerometer, and/or any other device capable of capturing data (e.g., a gyroscope). The TA server may use the received geographic coordinate data and telematics data to determine a location, or many locations of one or more stopping locations (e.g., stop signs or stop lights).

The plurality of user devices may be equipped with, for example, a GPS device. The GPS device may utilize GPS techniques to determine a measurement of geographic coordinates of the corresponding user device. Because some factors (e.g., atmospheric effects) may reduce the precision of the GPS device, the GPS device may return, for example, an error estimate along with the measured geographic location. The measured geographic location and error estimate may provide an area (e.g., a radius around the measured geographic location) where the user device may be located with a probability above a threshold probability.

The plurality of user devices may also be equipped with, for example, an accelerometer and/or a gyroscope. The accelerometer may be capable of measuring a linear and/or angular acceleration of the corresponding user device at a given moment in time. The gyroscope may be capable of determining an orientation of the user device. Accordingly, the accelerometer and gyroscope together may be used to determine a direction of acceleration, including positive or negative acceleration, of the user device. Data generated by the accelerometer and gyroscope may be used (e.g., by the TA server or user device) to generate telematics data (e.g., a location, orientation, acceleration, velocity, etc.) of the corresponding user device. Such telematics data may be used by the TA server, for example, to identify the possible locations of a stopping location, such as at an intersection having a stop sign.

In some embodiments, the TA server may receive telematics data from multiple user computing devices located in the same vehicle (e.g., drivers and passengers may all be transmitting data to the TA server). Accordingly, the TA server may determine that one user is a driver (e.g., to associate the telematics data and determined driving behaviors to the driver instead of to the passengers). The TA server may determine the driver of the vehicle through user input (e.g., prompting each of the users to input whether the user is a passenger or the driver), through matching known driving characteristics of the users with the driving characteristics of the driver (e.g., by matching driving profiles of the driver to driving profiles of each user to determine which driving profile is most similar), determining which user device is located nearest to the driver seat, and/or through any other driver determination method.

Examples of Determining Locations of Stopping Locations

The TA server may generate, in some embodiments, a mapping of stopping points within a certain area, or geographic location, like a city or town. The mapping may be produced from geographic coordinate data and telematics data collected from a plurality of user devices, as described above. The collected geographic coordinate data and telematics data may be stored on a memory device (e.g., a database associated with the TA server) or the like. In some embodiments, mapping data may be stored on a database and made accessible to one or more mobile applications via a network, such as a cellular network. Additionally, mapping data may be updated on an ongoing basis or dynamically, based at least in part upon the receiving of geographic coordinate data and telematics data over time.

In some embodiments, the TA server, or server, may apply machine learning techniques for building a mapping data model, or building a mapping data set. For example, user-submitted data via one or more sensors may include GPS coordinates, timing, and acceleration data. One or more types of data analysis, such as machine learning, or other techniques, may be used to identify instances of stopping events at certain locations. For example, stopping events may occur at the same location, such as an intersection, by a significant number of drivers. In this scenario, it may be reasonable to conclude that the intersection has a stop sign. Alternatively, or additionally, a stopping location may be identified based at least in part upon a percentage of drivers that come to a stop at a certain location. The percentage drivers may be a certain percentage above a threshold. For example, if 99% of drivers come to a complete stop, or even a near-stop, at a certain intersection, the intersection may be identified as being a "stop location" (e.g., having a stop sign or a stoplight or some other stop indication). Other percentage thresholds may be utilized, such as 75%. The actual percentage is not meant to be limiting, but merely exemplary for better understanding of the disclosed embodiments. Further data analysis may be performed, such as how long drivers are stopped at a certain location. This data may, in some embodiments, differentiate between different stopping locations such as a stop sign versus a stoplight, or the like.

Examples of Determining Driving Behavior

In some exemplary embodiments, the TA server may determine one or more driving behaviors of the drivers based at least in part upon the stop data associated with the drivers (e.g., whether the drivers generally stop at determined stop locations). The TA server may detect and/or determine erratic or aberrant driving behavior from drivers that may be considered any type of driving behavior violating certain traffic laws. Erratic driving behavior may include, but is not limited to, failure to come to a complete stop at a stop sign or at a red light (e.g., stoplight), excessive speed over a posted speed limit or compared to the speed of other drivers in the location of the driver (e.g., as determined through telematics data of the other drivers), sharp cornering, hard braking, or rapid acceleration starts. The TA server may receive, from a user computing device, a plurality of measurements captured by sensor components of the user computing device during the operation of a vehicle. Additionally or alternatively, the plurality of measurements may be captured by one or more sensors installed within the vehicle being driven by the user. The one or more sensors may include a GPS device, an accelerometer, a gyroscope, or any like sensory device equipped to collect telematics data. Data collected may include, but is not limited to, geographical coordinates, timing data, velocity, and acceleration, for example. The collected data may reveal driving behaviors of the driver while operating a vehicle of the driver.

In some embodiments, the TA server may compare the collected telematics data, geographical positioning data, and timing data of a user during the operation of a vehicle with a database, or model, of known stopping locations as described herein. In some embodiments, TA server may determine that, based at least in part upon the comparison, a driver was in a geographical location of an identified stopping location. Based at least in part upon telematics data gathered, TA server may determine what kind of stop the driver performed at the stopping point (e.g., full stop, rolling stop, no stop). Additionally or alternatively, the TA server may determine how long the driver remained stopped at the stopping location. The TA server may, based at least in part upon the analysis, generate a report or notification that may be transmitted to a mobile device of the driver. In some embodiments, the notification may inform the user of non-compliance of traffic laws to encourage safe driving behavior and/or inform the user that the user has generally safe driving behaviors (e.g., makes a full stop at 95% of stop signs, rarely is late getting through a stoplight, etc.). Further, the notification may include stop locations where the driver typically does not stop (e.g., along a routine driving route of the driver) and may show the identified stop locations on a map. In other words, the methods and systems described herein are intended to help the drivers with their driving behaviors or to notify the drivers of high risk intersections to better improve the safety of the driver.

Further, the TA server may generate a safety score for stop locations based at least in part upon the driving behaviors of drivers at the stop locations. For example, if most drivers do not make complete stops, run stoplights, or there is a high incidence of rolling stops at a stop location, the TA server may generate a low safety score for that stop location. If, for example, most drivers make complete stops or do not run stoplights, the TA server may generate a high safety score for that stop location. Accordingly, the TA server may notify the driver that stop locations with low safety scores are on a routine route of the driver and/or provide alternate routes for the driver to take to avoid the stop location with the low safety score.

In some embodiments, the TA server may transmit stopping data pertaining to the driver to an insurance company associated with the driver. The stopping data may indicate how well the driver is driving (e.g., whether the driver makes complete stops at stop signs, runs red lights, generally follows the flow of traffic or drives erratically, etc.). The insurance company may use the stopping data for calculating an insurance discount (e.g., on an insurance premium of an insurance policy of the driver) or generate other insurance policies (e.g., usage-based policies, personal mobility policies (PMP), etc.).

The TA server may analyze additional telematics data (e.g., real-time telematics data from a plurality of drivers) to reveal driving behaviors of drivers. Such driving events may trigger real-time notifications via a messaging server (e.g., SMS, email, etc.) to notify the driver and encourage safer driving habits/reducing accidents. The triggered notifications may also be transmitted to a third party, such as an insurance company. For example, the TA server may aggregate real-time telematics data from a plurality of drivers based at least in part upon location, and the TA server may determine any outliers in the real-time telematics data. The TA server may use the outliers in the telematics data to determine whether certain drivers pose an accident risk for other drivers. For example, if most drivers on a certain stretch of road are going between 25 miles per hour and 32 miles per hour, and one driver is determined to be going 60 miles per hour on the same stretch of road, the TA server may determine that the driver poses an accident risk and send a real-time notification to other drivers around the erratic driver. Further, for example, the TA server may determine that most drivers around a stoplight are slowing down before getting to the stoplight. If one driver is speeding up instead of slowing down, the TA server may determine that the driver may run the stoplight and may notify other drivers at or around the stoplight of the accident risk posed by the erratic driver.

In some exemplary embodiments, the TA server may transmit notifications on a periodic basis (e.g., daily, weekly, monthly, etc.). Additionally, or alternatively, the TA server may transmit real-time alerts to one or more drivers based at least in part upon current telematics data. As part of a safe driving platform, telematics data may be gathered from a plurality of devices during vehicle operation. In one nonlimiting example, drivers within close proximity may be notified if at least one of the drivers is driving erratically. The TA server may determine that, based at least in part upon the speed and location of a vehicle, the driver will not be able to stop in time with respect to an approaching stopping location (e.g., a stop sign). The other plurality of drivers may then receive a real-time alert about the situation. Other types of real-time alerts may be triggered, such as an aggressive driver being detected or the like.

At least one of the technical problems addressed by this system may include: (i) inability to determine stop locations mainly through telematics data and location data from users, (ii) inability to determine how users typically behave at stop locations (e.g., stop signs and stoplights), (iii) inability to determine unsafe intersections based at least in part upon whether users typically stop at the intersections, and/or (iv) inability to transmit real-time alerts to users about dangerous intersections based at least in part upon the telematics data and location data of the user.

A technical effect of the systems and processes described herein may be achieved by performing at least one of the following steps: (i) aggregating historical location data and historical telematics data from a plurality of users, wherein the historical location data and historical telematics data are gathered by one or more devices associated with each user of the plurality of users, (ii) generating mapping data based at least in part upon the historical location data and the historical telematics data, (iii) identifying one or more stop locations based at least in part upon the mapping data, (iv) storing, in the memory device, the identified stop locations, (v) receiving, from a user computing device associated with the driver of the vehicle, current location data and current telematics data after each trip taken by the driver, (vi) comparing the current location data and the current telematics data to the identified stop locations, (vii) generating stop data associated with the driver, wherein the stop data includes whether the driver stopped at the identified stop locations during each trip, and/or (viii) determining driving behaviors of the driver based at least in part upon the stop data, wherein the one or more driving behaviors includes how the driver behaves at the identified stop locations.

The technical effect achieved by this system may be at least one of: (i) determining stop locations mainly through telematics data and location data aggregated from users, (ii) determining how users typically behave at stop locations (e.g., stop signs and stoplights), (iii) determining unsafe intersections based at least in part upon whether users typically stop at the intersections, and/or (iv) transmitting real-time alerts to users about dangerous intersections based at least in part upon the telematics data and location data of the user.

Examples of Computer Systems

FIG. 1 depicts an exemplary telematics analysis (TA) computer system 100. TA computer system 100 may include a TA server 102. TA server 102 may include a database server 104. TA server 102 may be in communication with, for example, one or more of databases 106 (or other memory devices), user devices 108, and/or insurance provider devices 114.

In the exemplary embodiment, user devices 108 may be computers that include a web browser or a software application (e.g., an application 110) which enables user devices 108 to access remote computer devices, such as TA server 102, using the Internet or other network. More specifically, user devices 108 may be communicatively coupled to TA server 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. User devices 108 may be, for example, mobile devices, and user devices 108 may include a user interface 110 and an application 112 (e.g., hosted by and/or in communication with TA server 102).

TA server 102 may receive geographic coordinate data and/or telematics data from user devices 108 and/or other sensors. User devices 108 may include components for capturing and generating data, such as a GPS device, an accelerometer, a gyroscope, and any other device capable of capturing data. TA server 102 may use the received geographic coordinate data and telematics data to determine a location of each user devices 108.

User devices 108 may be equipped with, for example, a GPS device. A GPS device may utilize GPS techniques to determine a measurement of geographic coordinates of the corresponding user device. Because some factors (e.g., atmospheric effects) may reduce the precision of a GPS device, the GPS device may return, for example, an error estimate along with the measured geographic location. The measured geographic location and error estimate may provide an area (e.g., a radius around the measured geographic location) where the corresponding user device may be location with a probability above a threshold probability.

User devices 108 may also be equipped with, for example, an accelerometer and/or a gyroscope. An accelerometer may be capable of measuring a linear and/or angular acceleration of user devices 108 at a given moment in time. A gyroscope may be capable of determining an orientation of the user device. Accordingly, an accelerometer and a gyroscope together may be used to determine a direction of acceleration of user device 108. Data generated by an accelerometer and a gyroscope may be used (e.g., by TA server 102 and/or user devices 108) to generate telematics data (e.g., a location, orientation, acceleration, velocity, etc.) of user devices 108. Such telematics data may be used by TA server 102, for example, to generate an enhanced measurement of the geographic location of the user device to determine whether the user device is within close proximity to a stopping location, for example.

An insurance provider device 114 may be communicatively coupled with TA server 102. In some embodiments, insurance provider device 114 may be associated with, or is part of a computer network associated with an insurance provider, or in communication with the insurance provider's computer network (not shown). In other embodiments, insurance provider device 114 may be associated with a third party and is merely in communication with the insurance provider's computer network. That is, insurance provider device 114 may be associated with the insurance provider of the users (e.g., associated with user devices 108). More specifically, insurance provider device 114 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 114 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users, telematics data of the users, location data, stop location data, safety score data, etc. In the exemplary embodiment, database 106 may be stored remotely from TA server 102. In some embodiments, database 106 may be decentralized. In the exemplary embodiment, a user may access database 106 and/or TA server 102 via user device 108.

Examples of Processes for Monitoring User Driving Behavior

Figure 2:
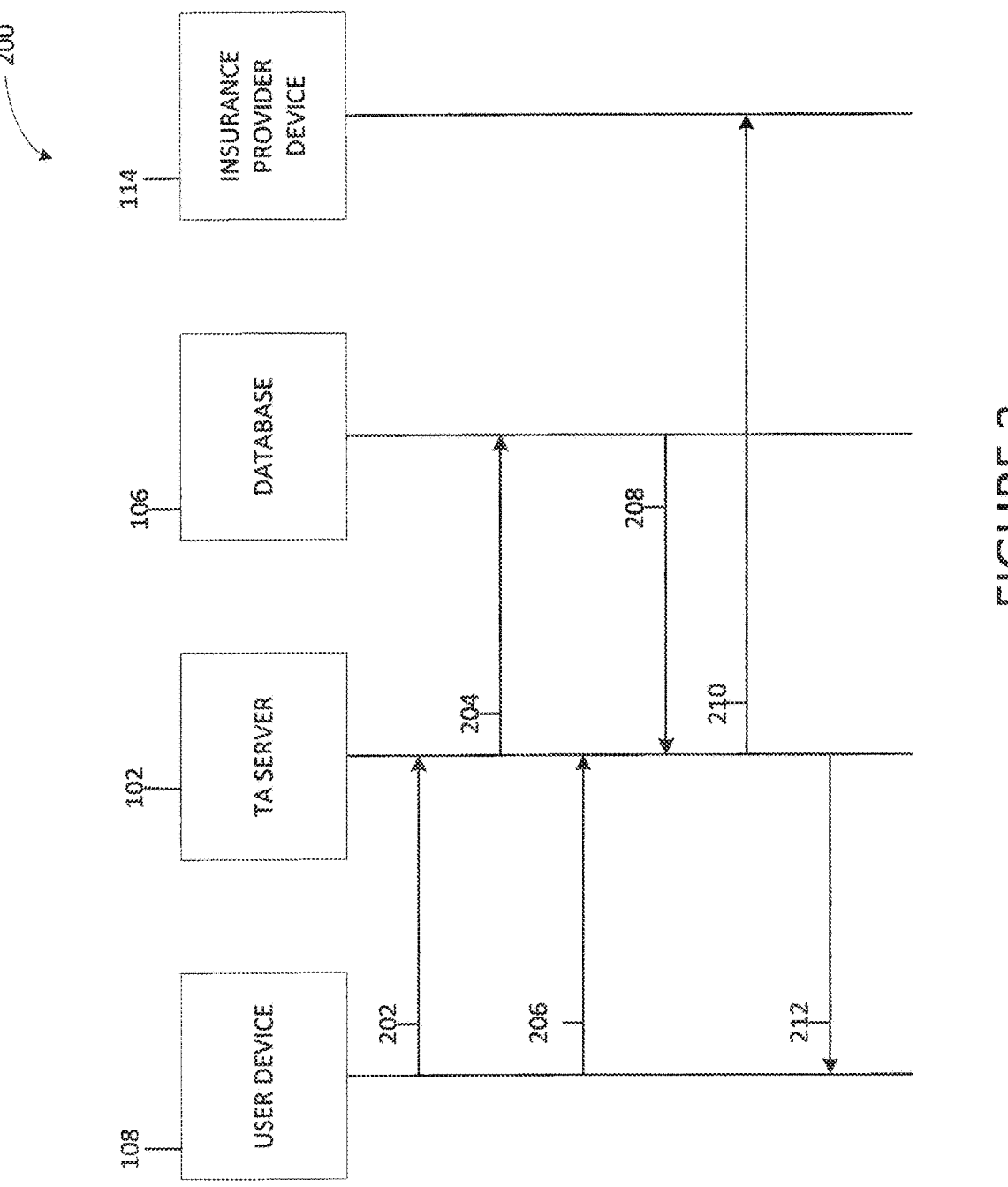
FIG. 2 illustrates an exemplary flow chart of an exemplary process that may be carried out by the computer system illustrated in FIG. 1.

FIG. 2 illustrates a flow chart of an exemplary process 200 for monitoring driving behaviors of drivers (e.g., associated with user devices 108). Process 200 may be carried out by TA computer system 100 (shown in FIG. 1).

In the exemplary embodiment, one or more users associated with user devices 108 may transmit historical GPS and telematics data 202 and/or user data 202 to TA server 102. Historical GPS and telematics data 202 may include geographic coordinates, time data, and acceleration data (e.g., for the identification of stopping locations) and user data 202 associated with each user included in the group. User data 202 may include demographics data, for example.

Based at least in part upon the received historical GPS and telematics data 202 and/or user data 202, TA server 102 may generate a plurality of stopping locations (e.g., stop signs or stoplights) 204 for one or more intersections and store the one or more intersections as map data 204 to at least one database, such as database 106. Each of the one or more identified intersections may include what type of stop is located at the intersection, such as a stop sign, a stop light, or the like. In some embodiments, stop locations may be overlaid onto map data when viewed on a screen, such as a mobile device display. Intersections may be identified through machine learning techniques. For example, an intersection may be identified as a stop location in response to reported data that includes telematics data having slowing acceleration rates, or complete stop events. Additionally, or alternatively, a vehicle may be identified as having a near-stop event. In other embodiments, a vehicle may be identified as having a complete stop event, for example if a car's velocity reaches zero, then accelerates after a certain period of time (e.g., three seconds). Other telematics data may be gathered, such as average velocity, average acceleration rates, or the like.

TA server 102 may receive current telematics data from at least one user device 108. TA server 102 may also receive other user-related data, such as GPS-based location data (e.g., geographic coordinates) and timing data. User data transmitted to TA server, step 206, may be collected on an ongoing basis by one or more sensors (e.g., GPS device, accelerometer, gyroscope) associated with a user while operating a vehicle. TA server 102 may retrieve 208 mapping and other data, as described above, from database 106. The collected user data, or current telematics data, may be compared with the mapping data to determine 210 a user's behavior while operating a vehicle. For example, based at least in part upon data reported by the user's device in view of map data, it may be determined that a user may have run through a red light, had missed a stop sign, or even just performed a so-called rolling stop, for example. In the event that a certain aberrant driving behavior has occurred, a notification may be sent to insurance provider device 114. The notification may include details of the infraction including nature of infraction, time, and other user-related data.

TA server 102 may notify 212 a driver, via a message to user device 108, of the detected aberrant driving behavior. In some embodiments, the message may be transmitted on a periodic basis (e.g., daily, weekly, etc.). The message may include other information as well, such as frequency of full-stops vs rolling stops, average speed above/below a posted speed limit, or the like.

Examples of Client Computing Devices

Figure 3:
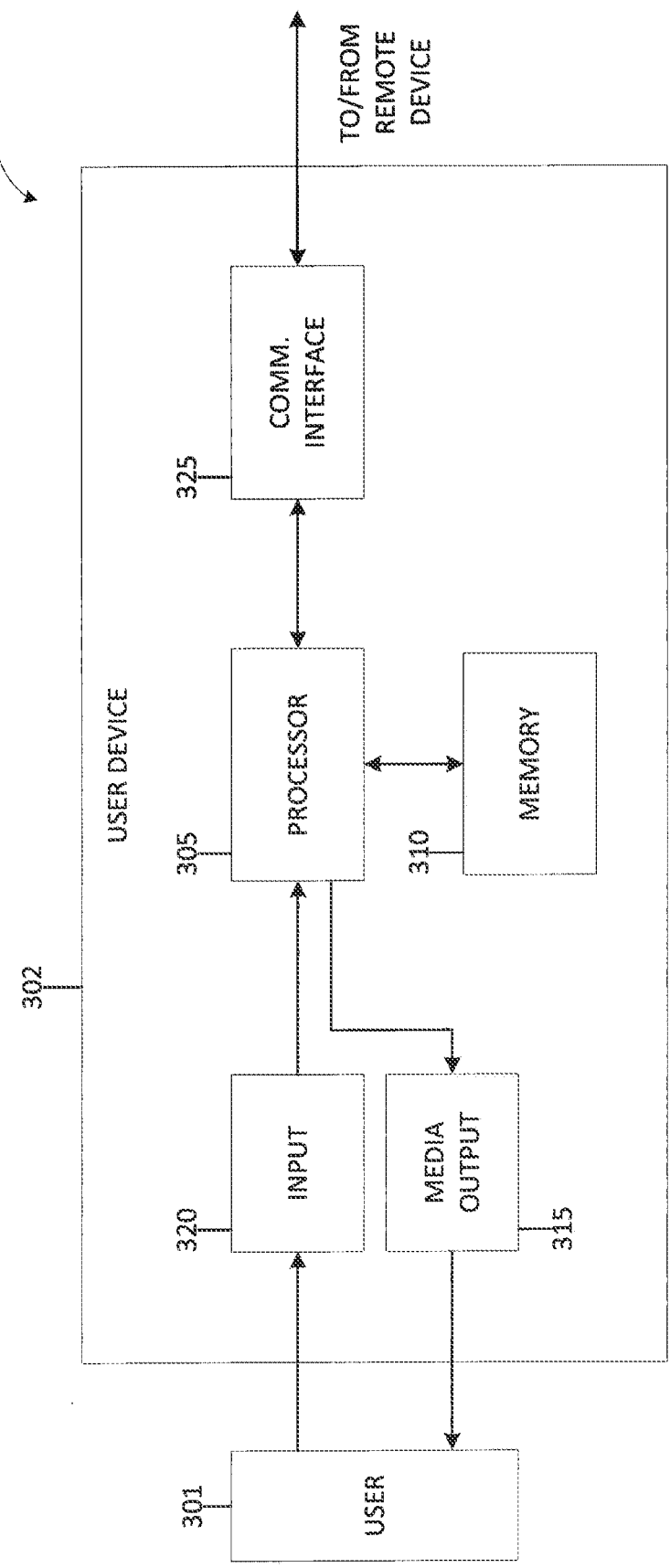
FIG. 3 illustrates an exemplary client computing device that may be used with the TA system illustrated in FIG. 1.

FIG. 3 depicts a block diagram 300 of an exemplary client computing device 302 that may be used with TA computer system 100 shown in FIG. 1. Client computing device 302 may be, for example, user devices 108 and/or insurance provider device 114 (shown in FIG. 1).

Client computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer readable media.

In exemplary embodiments, client computing device 302 may also include one media output component 315 for presenting information to a user 301. Media output component 315 may be any component capable of conveying information to user 301. In some embodiments, media output component 315 may include an output adapter such as a video adapter and/or an audio adapter. An output adapter may be operatively coupled to processor 305 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones). Media output component 315 may be configured to, for example, display an alert message identifying a statement as potentially false.

Client computing device 302 may also include an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Client computing device 302 may also include a communication interface 325, which can be communicatively coupled to a remote device such as TA server 102 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 may be, for example, computer-readable instructions for providing a user interface to user 301 via media output component 315 and, optionally, receiving and processing input from input device 320. A user interface may include, among other possibilities, a web browser and client application. Web browsers may enable users, such as user 301, to display and interact with media and other information typically embedded on a web page or a website.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Examples of Server Systems

Figure 4:
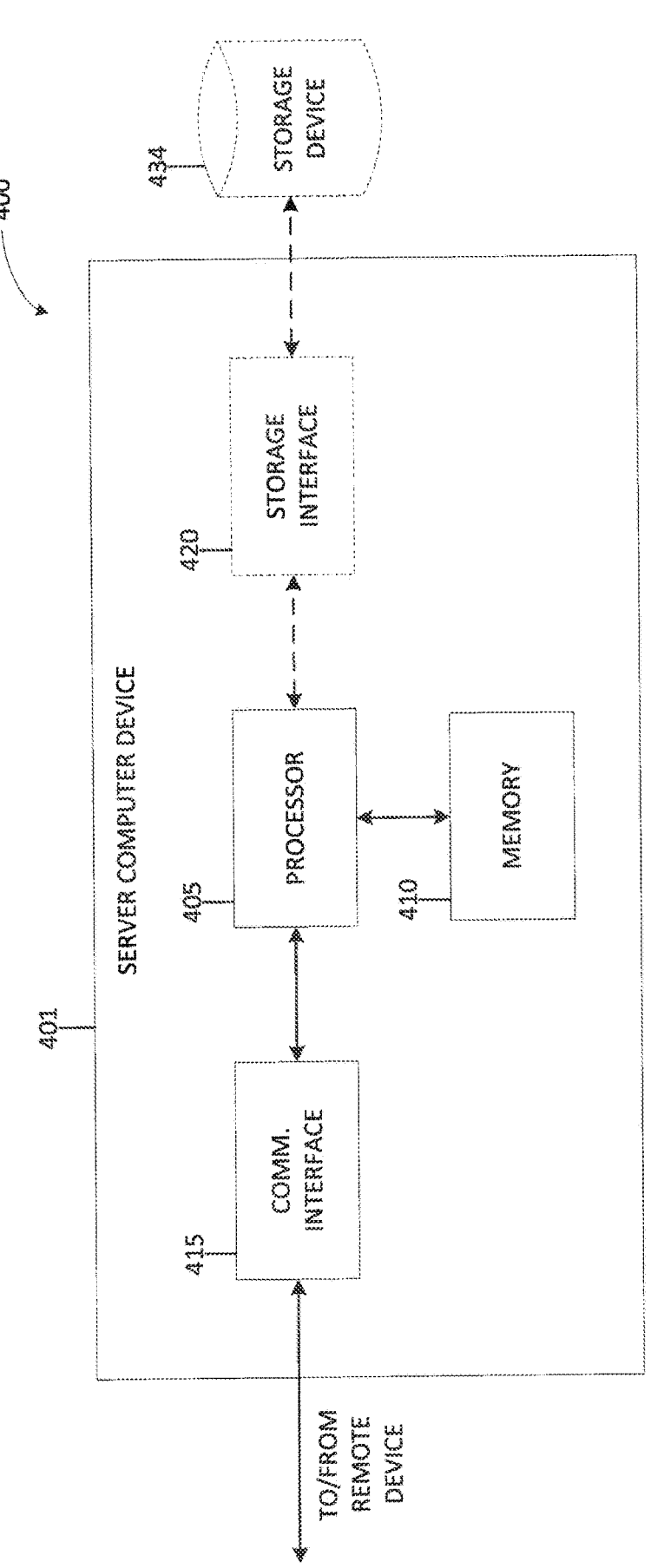
FIG. 4 illustrates an exemplary server system that may be used with the TA system illustrated in FIG. 1.

FIG. 4 depicts block diagram 400 of an exemplary server system 401 that may be used with TA computer system 100 illustrated in FIG. 1. Server system 401 may be, for example, TA server 102 and/or database server 104 (shown in FIG. 1).

In exemplary embodiments, server system 401 may include a processor 405 for executing instructions. Instructions may be stored in a memory area 410. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be needed in order to perform one or more processes described herein, while other operations may be more general and/or specific to a particular programming language (e.g., C, C #, C++, Java, or other suitable programming languages, etc.).

Processor 405 may be operatively coupled to a communication interface 415 such that server system 401 is capable of communicating with TA server device 102, first user device 108, second user device 108 (all shown in FIG. 1), and/or another server system. For example, communication interface 415 may receive requests from first user device 108 and/or second user device 108 via the Internet.

Processor 405 may also be operatively coupled to a storage device 417, such as database 106 (shown in FIG. 1). Storage device 417 may be any computer-operated hardware suitable for storing and/or retrieving data. In some embodiments, storage device 417 may be integrated in server system 401. For example, server system 401 may include one or more hard disk drives as storage device 417. In other embodiments, storage device 417 may be external to server system 401 and may be accessed by a plurality of server systems 401. For example, storage device 417 may include multiple storage units such as hard disks or solid state disks in a redundant array of inexpensive disks (RAID) configuration. Storage device 417 may include a storage area network (SAN) and/or a network attached storage (NAS) system.

In some embodiments, processor 405 may be operatively coupled to storage device 417 via a storage interface 420. Storage interface 420 may be any component capable of providing processor 405 with access to storage device 417. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 417.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Examples of Computer Devices

Figure 5:
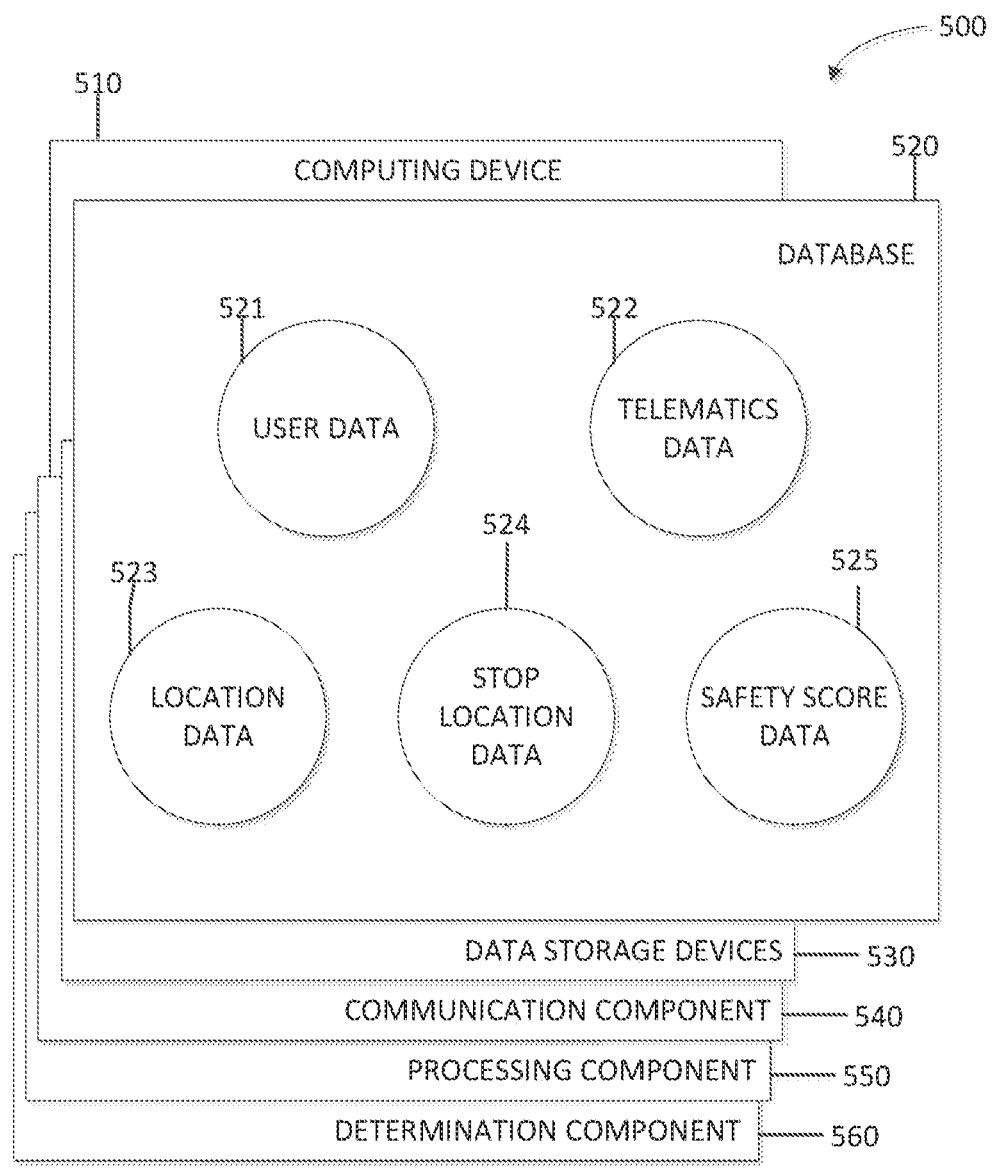
FIG. 5 illustrates a series of components that may be used with the TA system illustrated in FIG. 1.

FIG. 5 depicts a diagram 500 of components of one or more exemplary computing devices that may be used in system 100 (shown in FIG. 1) and/or to carry out method 600 (shown in FIG. 6).

In some embodiments, computing device 510 may be similar to TA server 102 (shown in FIG. 1). Database 520 may be coupled with several separate components within computing device 510, which perform specific tasks. In this embodiment, database 520 may include user data 521 (e.g., historical driving data including historical GPS location data and historical telematics data), telematics data 522 (e.g., current telematics data of users, including acceleration, braking, cornering, speed, miles, and location information), location data 523 (e.g., current GPS-location data of users), stop location data 524 (e.g., location data of stop signs or stop lights), and safety score data 525 (e.g., score data for one or more stop sign locations, stop light locations, or intersections). In some embodiments, database 520 is similar to database 106 (shown in FIG. 1).

Computing device 510 may include database 520, as well as one or more data storage devices 530. Computing device 510 may also include a communication component 540 for transmitting and receiving data between TA server 102, user devices 108, and insurance provider device 114 (shown in FIG. 1). Computing device 510 may further include a processing component 550 that may, for example, process telematics data (e.g., received from user devices 108). A determination component 560 may determine driver behavior statistics according to current location data and current telematics data in view of historical location data and historical telematics data and/or determine stop locations based at least in part upon the historical location data and the historical telematics data.

Examples of Methods for Detecting Traffic Law Compliance

FIG. 6 depicts an exemplary method 600 that may include a process for determining stopping locations and the compliance of the stopping locations by one or more users operating a vehicle. Method 600 may be implemented by TA server 102 and respective devices of FIG. 1.

Method 600 may include aggregating 605 historical location data and historical telematics data of a plurality of users. The historical location data and the historical telematics data may be gathered by devices associated with the plurality of users. Method 600 may further include generating 610 mapping data based at least in part upon the received 605 historical location data and historical telematics data. Further, method 600 may identify 615 one or more stop locations based at least in part upon the generated 610 mapping data. The stop locations may include stop signs and stoplights. The identified stop locations may be stored 620 in a memory device (e.g., database 106 of FIG. 1).

Method 600 may include receiving 625, from a user computing device associated with a driver of a vehicle, current location data and current telematics data after each trip of the driver. In some embodiments, the current location data and current telematics data may be received 625 in real-time. Method 600 may include comparing 630 the current location data and current telematics data to the identified 615 stop locations. Additionally, method 600 may include generating 635 stop data associated with the driver. The stop data may include whether the driver stopped at the identified 615 stop locations during each trip. Further, method 600 may include determining 640 driving behaviors of the driver based at least in part upon the stop data. The driving behaviors may include how the driver behaves at the identified stop locations.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs.

As described above, the systems and methods described herein may use machine learning, for example, for pattern recognition. That is, machine learning algorithms may be used by DI computing device 102, for example, to identify patterns in GPS data and telematics data to determine when a plurality of user devices are traveling in a same vehicle on a trip, to determine a position of one user device relative to another user device, and to identify a user device corresponding to a driver of the vehicle. Accordingly, the systems and methods described herein may use machine learning algorithms for both pattern recognition and predictive modeling.

EXAMPLES OF EMBODIMENTS

In the exemplary embodiment, a telematics analysis (TA) server device including at least one processor in communication with a memory device may be provided. The at least one processor may be configured to: (i) aggregate historical location data and historical telematics data from a plurality of users, wherein the historical location data and historical telematics data are gathered by one or more devices associated with each user of the plurality of users, (ii) generate mapping data based at least in part upon the historical location data and the historical telematics data, (iii) identify one or more stop locations based at least in part upon the mapping data, (iv) store, in the memory device, the identified stop locations, (v) receive, from a user computing device associated with the driver of the vehicle, current location data and current telematics data after each trip taken by the driver, (vi) compare the current location data and the current telematics data to the identified stop locations, (vii) generate stop data associated with the driver for each trip taken by the driver, wherein the stop data includes whether the driver stopped at the identified stop locations during each trip, and/or (viii) determine one or more driving behaviors of the driver based at least in part upon the stop data, wherein the one or more driving behaviors includes how the driver behaves at the identified stop locations. The TA server may include additional, less, or alternate actions, including those discussed elsewhere herein.

A further enhancement may include the at least one processor being configured to: (i) determine that a user associated with the user computing device is the driver of the vehicle, (ii) store, in the memory device, the stop data for each trip taken by the driver, (iii) determine, based at least in part upon the stop data, one or more flagged locations where the driver frequently does not stop, and/or (iv) display, on the user computing device, the determined one or more flagged locations where the driver frequently does not stop.

The one or more stop locations based at least in part upon the mapping data may include: (i) determining, using one or more machine learning and artificial intelligence techniques, stop locations, wherein the stop locations include stop sign locations and stoplight locations. The at least one processor may further be configured to: (i) receive, from a plurality of user computing devices associated with a plurality of drivers, current location data and current telematics data after each trip taken by each driver of the plurality of drivers, (ii) generate stop data for each trip taken by the drivers, wherein the stop data includes whether the drivers stopped at the identified stop locations during each trip, (iii) determine, based at least in part upon the stop data, stop locations where the drivers frequently do not stop, (iv) determine a safety score for each stop location, wherein the safety score is high for stop locations where the drivers frequently stop, and wherein the safety score is low for stop locations where the drivers frequently do not stop, (v) transmit one or more safety suggestions to the plurality of user computing devices, wherein the one or more safety suggestions include one of a) identifying stop locations with a low safety score, b) suggesting that the users avoid the stop locations with the low safety scores, and c) providing one or more alternate routes avoiding the stop locations with the low safety scores, (vi) receive the current telematics data and the current location data in real-time, (vii) analyze the current telematics data and the current location data in real-time, and/or (viii) transmit one or more corrective action alerts to the plurality of user computing devices in real-time, wherein the corrective action alerts include one of a) warning the drivers that a stop location where the drivers frequently do not stop is upcoming, b) warning the drivers that a stop location with a low safety score is upcoming, c) providing the drivers with an alternative route to avoid the stop locations with the low safety scores, and d) warning the drivers of erratic driving behaviors of other drivers, as determined by the current telematics data and the current location data of the other drivers.

The TA computing device may be associated with an insurance provider device, and the insurance provider device may be associated with an insurance provider of the driver. The at least one processor may be further configured to transmit the stop data associated with the driver to the insurance provider device.

Further, in the exemplary embodiment, a computer-implemented method for monitoring driving behavior of a driver of a vehicle may be provided. The computer-implemented method may be implemented by a telematics analysis (TA) computing device including at least one processor in communication with a memory device. The computer-implemented method may include: (i) aggregating historical location data and historical telematics data from a plurality of users, wherein the historical location data and historical telematics data are gathered by one or more devices associated with each user of the plurality of users, (ii) generating mapping data based at least in part upon the historical location data and the historical telematics data, (iii) identifying one or more stop locations based at least in part upon the mapping data, (iv) storing, in the memory device, the identified stop locations, (v) receiving, from a user computing device associated with the driver of the vehicle, current location data and current telematics data after each trip taken by the driver, (vi) comparing the current location data and the current telematics data to the identified stop locations, (vii) generating stop data associated with the driver, wherein the stop data includes whether the driver stopped at the identified stop locations during each trip, and/or (viii) determining driving behaviors of the driver based at least in part upon the stop data, wherein the one or more driving behaviors includes how the driver behaves at the identified stop locations. The computer-implemented method may include additional, less, or alternate actions, including those discussed elsewhere herein.

Even further, in the exemplary embodiment, at least one non-transitory computer-readable media having computer-executable instructions embodied thereon may be provided that may, when executed by a telematics analysis (TA) server device including at least one processor in communication with a memory device, cause the at least one processor to:

(i) aggregate historical location data and historical telematics data from a plurality of users, wherein the historical location data and historical telematics data are gathered by one or more devices associated with each user of the plurality of users, (ii) generate mapping data based at least in part upon the historical location data and the historical telematics data, (iii) identify one or more stop locations based at least in part upon the mapping data, (iv) store, in the memory device, the identified stop locations, (v) receive, from a user computing device associated with the driver of the vehicle, current location data and current telematics data after each trip taken by the driver, (vi) compare the current location data and the current telematics data to the identified stop locations, (vii) generate stop data associated with the driver for each trip taken by the driver, wherein the stop data includes whether the driver stopped at the identified stop locations during each trip, and/or (viii) determine one or more driving behaviors of the driver based at least in part upon the stop data, wherein the one or more driving behaviors includes how the driver behaves at the identified stop locations. The computer-implemented instructions may include additional, less, or alternate functionality, including those discussed elsewhere herein.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without the need for a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A telematics analysis computing device for monitoring driving behavior of a driver of a vehicle, the telematics analysis computing device comprising one or more processors in communication with a memory device comprising computer instructions that, when run on the one or more processors, cause the one or more processors to execute operations comprising:

receiving telematics data collected from one or more electronic devices of one or more users;

analyzing the telematics data to determine (a) one or more stop locations and (b) one or more driving behaviors of the one or more users at the one or more stop locations;

generating, based on analyzing the telematics data, safety scores for the one or more stop locations;

generating a route based on a request received from an electronic device of the driver;

identifying, along the route, as generated, at least one of the one or more stop locations having a respective safety score of the safety scores that is below a predetermined threshold; and transmitting a notification to the electronic device of the driver that at least one of the one or more stop locations has at least one respective safety score of the safety scores that is below the predetermined threshold.

2. The telematics analysis computing device of claim 1, wherein the operations further comprise:

generating an alternative driving route that avoids the at least one of the one or more stop locations having the at least one respective safety score of the safety scores that is below the predetermined threshold.

3. The telematics analysis computing device of claim 1, wherein transmitting the notification further comprises:

transmitting the notification to the electronic device of the driver to warn the driver about the at least one of the one or more stop locations while the driver heads towards the at least one of the one or more stop locations.

4. The telematics analysis computing device of claim 1, wherein the notification comprises a map showing the at least one of the one or more stop locations having the respective safety score that is below the predetermined threshold.

5. The telematics analysis computing device of claim 1, wherein the operations further comprise:

generating mapping data based at least in part upon geographic coordinate data and the telematics data received from the one or more electronic devices of the one or more users;

identifying the one or more stop locations based at least in part upon the mapping data; and comparing current location data and current telematics data to the one or more stop locations, as identified.

6. The telematics analysis computing device of claim 1, wherein the notification comprises a report for the driver regarding driving behaviors of the driver.

7. The telematics analysis computing device of claim 1, wherein analyzing the telematics data further comprises:

detecting types of stops performed by the one or more users at the one or more stop locations, wherein the types of stops comprise: a full stop, a rolling stop, or no stop.

8. A computer-implemented method for monitoring driving behavior of a driver of a vehicle, the computer-implemented method comprising:

receiving telematics data collected from one or more electronic devices of one or more users;

analyzing the telematics data to determine (a) one or more stop locations and (b) one or more driving behaviors of the one or more users at the one or more stop locations;

generating, based on analyzing the telematics data, safety scores for the one or more stop locations;

generating a route based on a request received from an electronic device of the driver;

identifying, along the route, as generated, at least one of the one or more stop locations having a respective safety score of the safety scores that is below a predetermined threshold; and transmitting a notification to the electronic device of the driver that at least one of the one or more stop locations has at least one respective safety score of the safety scores that is below the predetermined threshold.

9. The computer-implemented method of claim 8, wherein transmitting the notification further comprises:

generating an alternative driving route that avoids the at least one of the one or more stop locations having the at least one respective safety score of the safety scores that is below the predetermined threshold.

10. The computer-implemented method of claim 8, wherein transmitting the notification further comprises:

transmitting the notification to the electronic device of the driver to warn the driver about the at least one of the one or more stop locations while the driver heads towards the at least one of the one or more stop locations.

11. The computer-implemented method of claim 8, wherein the notification comprises a map showing the at least one of the one or more stop locations having the respective safety score that is below the predetermined threshold.

12. The computer-implemented method of claim 8, further comprising:

generating mapping data based at least in part upon geographic coordinate data and the telematics data received from the one or more electronic devices of the one or more users;

identifying the one or more stop locations based at least in part upon the mapping data; and comparing current location data and current telematics data to the one or more stop locations, as identified.

13. The computer-implemented method of claim 8, wherein the notification comprises a report for the driver regarding driving behaviors of the driver.

14. The computer-implemented method of claim 8, wherein analyzing the telematics data further comprises:

detecting types of stops performed by the one or more users at the one or more stop locations, wherein the types of stops comprise: a full stop, a rolling stop, or no stop.

15. A system comprising one or more processors and one or more non-transitory computer-readable media storing computing instructions that, when executed on the one or more processors, cause the one or more processors to execute operations comprising:

receiving telematics data collected from one or more electronic devices of one or more users;

analyzing the telematics data to determine (a) one or more stop locations and (b) one or more driving behaviors of the one or more users at the one or more stop locations;

generating, based on analyzing the telematics data, safety scores for the one or more stop locations;

generating a route based on a request received from an electronic device of a driver;

identifying, along the route, as generated, at least one of the one or more stop locations having a respective safety score of the safety scores that is below a predetermined threshold; and transmitting a notification to the electronic device of the driver that at least one of the one or more stop locations has at least one respective safety score of the safety scores that is below the predetermined threshold.

16. The system of claim 15, wherein the operations further comprise:

generating an alternative driving route that avoids the at least one of the one or more stop locations having the at least one respective safety score of the safety scores that is below the predetermined threshold.

17. The system of claim 15, wherein transmitting the notification further comprises:

transmitting the notification to the electronic device of the driver to warn the driver about the at least one of the one or more stop locations while the driver heads towards the at least one of the one or more stop locations.

18. The system of claim 15, wherein the notification comprises a map showing the at least one of the one or more stop locations having the respective safety score that is below the predetermined threshold.

19. The system of claim 15, wherein the notification comprises a report for the driver regarding driving behaviors of the driver.

20. The system of claim 15, wherein analyzing the telematics data further comprises:

detecting types of stops performed by the one or more users at the one or more stop locations, wherein the types of stops comprise: a full stop, a rolling stop, or no stop;

generating mapping data based at least in part upon geographic coordinate data and the telematics data received from the one or more electronic devices of the one or more users;

identifying the one or more stop locations based at least in part upon the mapping data; and comparing current location data and current telematics data to the one or more stop locations, as identified.

* * * * *